United States Patent
Yamamoto

(10) Patent No.: US 11,179,672 B2
(45) Date of Patent: Nov. 23, 2021

(54) METHOD AND APPARATUS FOR REDUCING MERCURY CONTENT OF CEMENT KILN EXHAUST GAS

(71) Applicant: Taiheiyo Engineering Corporation, Tokyo (JP)

(72) Inventor: Yasushi Yamamoto, Tokyo (JP)

(73) Assignee: TAIHEIYO ENGINEERING CORPORATION, Tokyo (JP)

( * ) Notice: Subject to any disclaimer, the term of this patent is extended or adjusted under 35 U.S.C. 154(b) by 104 days.

(21) Appl. No.: 15/768,795

(22) PCT Filed: Nov. 13, 2017

(86) PCT No.: PCT/JP2017/040706
§ 371 (c)(1),
(2) Date: Apr. 16, 2018

(87) PCT Pub. No.: WO2018/131277
PCT Pub. Date: Jul. 19, 2018

(65) Prior Publication Data
US 2020/0261845 A1      Aug. 20, 2020

(30) Foreign Application Priority Data
Jan. 11, 2017   (JP) ..................... 20172473

(51) Int. Cl.
*B01D 53/64* (2006.01)
*B01D 53/75* (2006.01)
*F27D 17/00* (2006.01)
*C04B 7/60* (2006.01)

(52) U.S. Cl.
CPC ............. *B01D 53/64* (2013.01); *B01D 53/75* (2013.01); *C04B 7/60* (2013.01); *F27D 17/00* (2013.01); *F27D 2017/009* (2013.01)

(58) Field of Classification Search
CPC .......... B01D 53/64; B01D 53/75; C04B 7/60; F27D 17/00
See application file for complete search history.

(56) References Cited

U.S. PATENT DOCUMENTS

2019/0010088 A1* 1/2019 Leibinger ............... C04B 7/364

FOREIGN PATENT DOCUMENTS

| JP | 2013112579 A | * | 6/2013 |
| JP | 2014058699 A | * | 4/2014 |

* cited by examiner

*Primary Examiner* — Yong L Chu
(74) *Attorney, Agent, or Firm* — Stetina Brunda Garred and Brucker; Mark B. Garred

(57) ABSTRACT

An apparatus for reducing mercury content of cement kiln exhaust gas 11 comprising: a mixing and heating device 19 for mixing cement kiln dusts D2, D4 included in a cement kiln combustion exhaust gas G1 into a cement raw material R2 withdrawn from a cyclone 4C (or 4B) other than the highest stage cyclone 4D and the lowest stage cyclone 4A of a preheater 4 for preheating cement raw material R1 while heating the cement kiln dusts D2, D4 through sensible heat of the cement raw material R2; a mercury recovery device 21 for recovering mercury Hg vaporized from the cement kiln dusts D2, D4 by the mixing and heating; and a feeder for feeding mercury-removed dusts D5, D6 discharged from the mixing and heating device 19 to a cyclone 4B (or 4A) positioning at a lower stage from the cyclone 4C (or 4B) from which the cement raw material R2 is withdrawn.

16 Claims, 1 Drawing Sheet

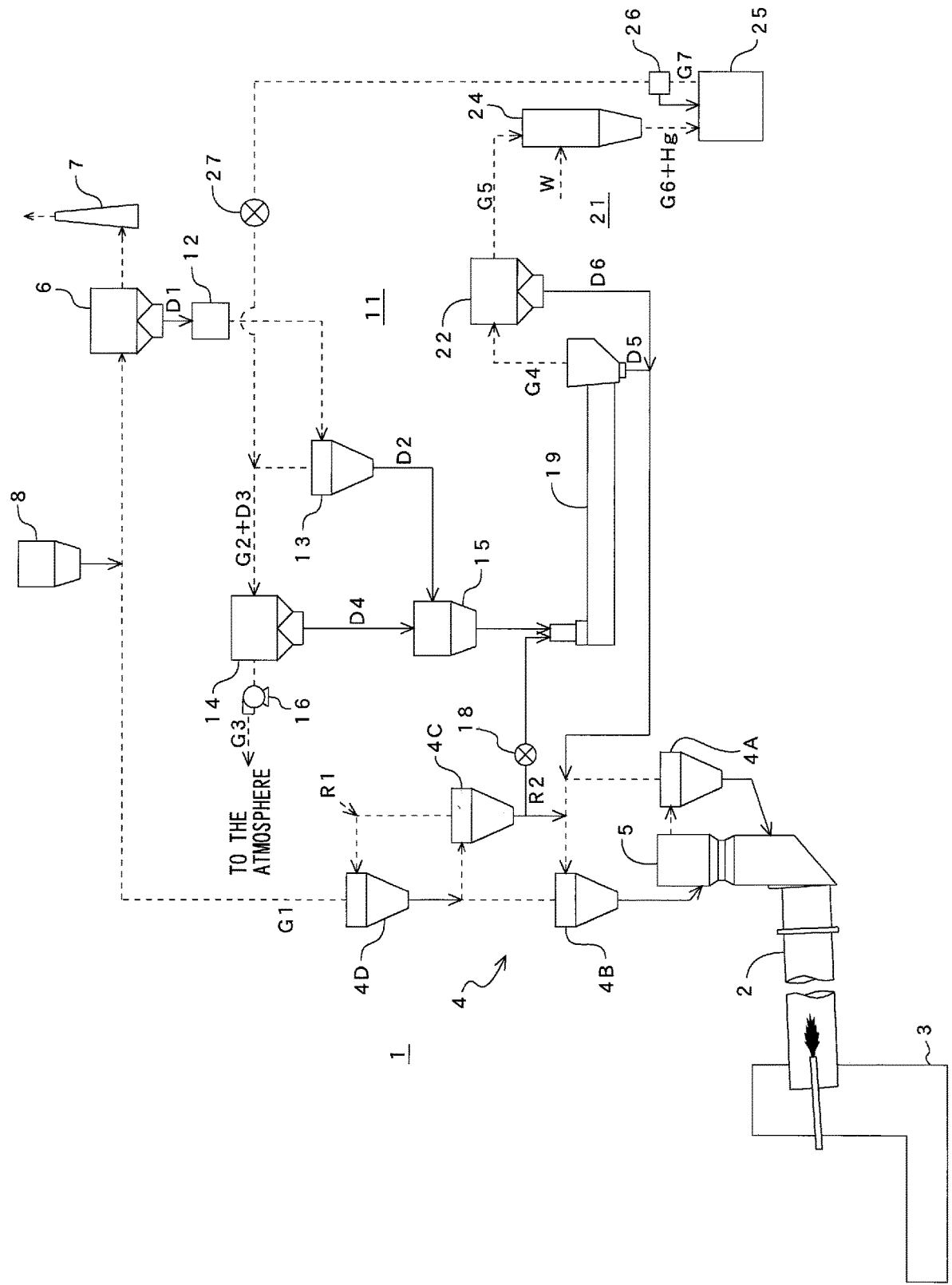

METHOD AND APPARATUS FOR REDUCING MERCURY CONTENT OF CEMENT KILN EXHAUST GAS

CROSS-REFERENCE TO RELATED APPLICATIONS

The present application claims priority to International Application No. PCT/JP2017/040706 filed on Nov. 13, 2017, which claims priority to Japanese Patent Application No. 2017-2473 filed on Jan. 11, 2017, the disclosures of which are incorporated herein by reference.

STATEMENT RE: FEDERALLY SPONSORED RESEARCH/DEVELOPMENT

Not Applicable

BACKGROUND

1. Technical Field

The present invention relates to a method and an apparatus for recovering mercury in cement kiln exhaust gas together with raw material dust (hereinafter referred to as "cement kiln dust") to reduce mercury therein.

2. Background Art

In raw material and fuel for cement and recycled resources is included mercury, so that in combustion exhaust gas of a cement kiln using them as raw material and the like are included an extremely small amount of metal mercury (Hg) and mercurial compounds.

Then, in Patent document 1 is proposed a method for heating collected cement kiln dust with exhaust gas of a clinker cooler and recovering mercury vaporized by the heating in order to remove mercury and the like included in cement kiln exhaust gas and reuse collected dust after the mercury and the like are removed as a cement raw material.

But, since airstream heating method described in Patent document 1 introduces both the vaporized mercury and the exhaust gas used for heating the collected dust to a mercury recovery device, there are problems that the mercury recovery device increases in size and facility and operation costs increase.

On the other hand, in Patent document 2 is described a method for indirectly heating cement kiln dust in an external heating kiln and recovering mercury vaporized from the dust. Although the indirect heating method allows the mercury recovery device to be decreased in size because the cement kiln dust is not heated through airstream, heat necessary to vaporize the mercury increases because the dust is not directly heated, and facility and operation costs of the external heating kiln increase.

In consideration of the above problems, in Patent document 3 are proposed a mercury recovery system and the like including a mixer for mixing cement kiln dust with cement raw material withdrawn from a preheater of a cement burning device while heating it through sensible heat of the cement raw material and the like, and a mercury recovery device for recovering mercury vaporized by the mixing and heating. With the system and the like, to vaporize mercury is utilized the cement raw material in the cement manufacturing equipment without increasing the mercury recovery device in size, so that energy consumption can be reduced and operation and facility costs can be reduced.

Patent document 1: Japanese patent publication No. 2011-88770 gazette
Patent document 2: Japanese patent publication No. 2003-245642 gazette
Patent document 3: Japanese patent publication No. 2014-58699 gazette

BRIEF SUMMARY

Although the system and the like described in the Patent document 3 are effective, a vibrating fluidized-bed type classifier for fluidizing a mixture of the cement kiln dust and the cement raw material and separating into a coarse powder and a gas including a fine powder complicates device structure of the system, so that there is a room for improvement.

Then, the object of the present invention is to efficiently and inexpensively reduce amount of mercury in cement kiln exhaust gas by simplifying device structure and reducing facility and operation costs when mercury is recovered from cement kiln dust by using cement raw material withdrawn from a preheater of a cement burning device.

In order to attain the above-mentioned object, the present invention relates to a method for reducing mercury content of cement kiln exhaust gas, and the method is characterized by including the steps of: mixing a cement kiln dust included in a cement kiln combustion exhaust gas into a cement raw material withdrawn from a cyclone other than a highest stage cyclone and a lowest stage cyclone of a preheater for preheating cement raw material while heating the cement kiln dust through sensible heat of the withdrawn cement raw material; recovering mercury vaporized from the cement kiln dust by the mixing and heating; and returning a mixture of the cement kiln dust and the cement raw material after the mixing and heating to a cyclone positioning at a lower stage from the cyclone from which the cement raw material is withdrawn.

With the present invention, the cement kiln dust is mixed into the cement raw material withdrawn from the cyclone, which has an optimal temperature for vaporizing the mercury included in the cement kiln dust, other than the highest stage cyclone and the lowest stage cyclone of the preheater to heat the cement kiln dust, and heat of the mixture of the cement kiln dust and the cement raw material after the mixing and heating is recovered in the cyclone positioning at the lower stage from the cyclone from which the cement raw material is withdrawn, so that amount of the mercury included in the cement kiln exhaust gas can be efficiently reduced while heat loss is suppressed. In addition, the mixture after the mixing and heating is returned to the cyclone positioning at a lower stage from the cyclone from which the cement raw material is withdrawn, so that transporting cost for the cement raw material and the mixture can be reduced. Further, classification is not required before the mercury is recovered, so that operation cost can be reduced also.

In the method for reducing mercury content of cement kiln exhaust gas, measuring temperature of the mixture of the cement kiln dust and the cement raw material, which are discharged from the mixing and heating device, and controlling amount of the cement raw material withdrawn from the cyclone based on the measurement result allow influence by the withdrawing of the cement raw material on a cement burning device to be minimized.

In the method for reducing mercury content of cement kiln exhaust gas, adding chlorine to the cement kiln dust allows mercury included in the cement kiln dust to be converted into chloride to lower the boiling point thereof, which can recover mercury more efficiently.

In the method for reducing mercury content of cement kiln exhaust gas, an activated carbon as a mercury adsorbent is added to exhaust gas from the preheater, and mercury included in the exhaust gas is recovered as the cement kiln dust, which can efficiently recover mercury with the activated carbon.

In addition, the present invention relates to an apparatus for reducing mercury content of cement kiln exhaust gas, and the device is characterized by including: a mixing and heating device for mixing a cement kiln dust included in a cement kiln combustion exhaust gas into a cement raw material withdrawn from a cyclone other than a highest stage cyclone and a lowest stage cyclone of a preheater for preheating cement raw material while heating the cement kiln dust through sensible heat of the withdrawn cement raw material; a mercury recovery device for recovering mercury vaporized from the cement kiln dust by the mixing and heating; and a feeder for feeding a mixture of the cement kiln dust and the cement raw material discharged from the mixing and heating device to a cyclone positioning at a lower stage from the cyclone from which the cement raw material is withdrawn.

With the present invention, as same as the above-mentioned invention, amount of the mercury included in the cement kiln exhaust gas can be efficiently reduced with a simple structure. In addition, the mixture after the mixing and heating is returned to the cyclone positioning at the lower stage from that from which the cement raw material is withdrawn, so that it is possible to reduce cost required for transporting the cement raw material and the mixture. Further, it is not necessary to separately mount a classifier to the prestage of the mercury recovery device, so that device structure can be simplified to reduce cost.

In the apparatus for reducing mercury content of cement kiln exhaust gas, the apparatus may include a thermometer for measuring temperature of the mixture of the cement kiln dust and the cement raw material discharged from the mixing and heating device, and a controller for controlling amount of the cement raw material withdrawn from the cyclone based on the measurement result, which minimizes influence by the withdrawing of the cement raw material on a cement burning device.

In the apparatus for reducing mercury content of cement kiln exhaust gas can be mounted a chlorine adding device for adding chlorine to the cement kiln dust. With this, the mercury included in the cement kiln dust can be converted into chloride to lower the boiling point thereof, so that the mercury can be recovered more efficiently.

In the apparatus for reducing mercury content of cement kiln exhaust gas, it is possible to mount a mercury adsorbent feeder for feeding an activated carbon as a mercury adsorbent to an exhaust gas of the preheater and a dust collector for recovering mercury included in the exhaust gas of the preheater in the cement kiln dust, and mercury can be efficiently recovered from the exhaust gas with the activated carbon.

As described above, with the present invention, efficiently recovering mercury from cement kiln dust at low cost can reduce amount of mercury included in cement kiln exhaust gas.

BRIEF DESCRIPTION OF THE DRAWINGS

FIG. 1 is an entire configuration drawing showing an apparatus for reducing mercury content of cement kiln exhaust gas according to an embodiment of the present invention.

DETAILED DESCRIPTION

Next, an embodiment for carrying out the present invention will be explained with reference to the drawing in detail.

FIG. 1 shows an apparatus for reducing mercury content of cement kiln exhaust gas according to an embodiment of the present invention, and the mercury reduction apparatus 11 is attached to an ordinary cement burning device 1 including a cement kiln 2, a clinker cooler 3, a preheater 4, a calciner 5 and so on. Cement kiln dust (hereinafter abbreviated as "kiln dust") D1 is a dust collected by a dust collector 6 where an exhaust gas G1 discharged from the highest stage cyclone 4D of the preheater 4 reaches via a cement raw material drying and grinding device and the like (not shown), the dust collector 6 being mounted on the upstream side of a chimney 7. In addition, on the prestage of the dust collector 6 is mounted a mercury adsorbent feeder 8 for feeding mercury adsorbent such as activated carbon to a passage of the exhaust gas G1.

The mercury reduction apparatus 11 is provided with: a pneumatic transporter 12 for transporting the kiln dust D1 recovered in the dust collector 6 near the preheater 4; a cyclone 13 for recovering a coarse powder D2 from the transported kiln dust D1; a dust collector 14 for collecting a dust D4 from a gas G2 including fine powder D3 discharged from the cyclone 13; a volumetric feeder 15 for supplying the coarse powder D2 and the collected dust D4 to a mixing and heating device 19; a fan 16 for discharging an exhaust gas G3 from the dust collector 14 into the atmosphere; the mixing and heating device 19 for mixing the coarse powder D2 and the collected dust D4 supplied from the volumetric feeder 15 into a cement raw material R2 withdrawn from the third cyclone 4C of the preheater 4 and heating the coarse powder D2 and the collected dust D4 through sensible heat of the cement raw material R2; a mercury recovery device 21 for recovering mercuries vaporized from the coarse powder D2 and the collected dust D4 by the mixing and heating; and a feeder (not shown) for returning mercury-removed dusts D5, D6 discharged from the mixing and heating device 19 to the second cyclone 4B.

The mixing and heating device 19 functions as a transporter also, and is mounted to transport the coarse powder D2, the collected dust D4 and the cement raw material R2 while mixing and agitating them, to uniformize temperature of the mixture (mercury-removed dusts D5 and D6), and to vaporize mercury. Unlike the description in FIG. 1, it is preferable to arrange the mixing and heating device 19 between the third cyclone 4C and the second cyclone 4B and transport the cement raw material R2 and the mercury-removed dusts D5, D6 while utilizing potential energies thereof.

The mercury recovery device 21 is provided with a high temperature dust collector 22 for removing dust in an exhaust gas G4 from the mixing and heating device 19; a heat exchanger 24 for performing heat exchange between an exhaust gas G5 from the high temperature dust collector 22 and a cooling water W to condense vaporized mercury included in the exhaust gas G5; a mercury recovery tank 25 for storing mercury Hg fed from the heat exchanger 24; a gas/liquid separator 26 for returning mercury included in an exhaust gas G7 from the mercury recovery tank 25 to the mercury recovery tank 25; and a flow rate control valve 27 for adjusting flow rate of the exhaust gas G7.

The cement raw material R2 has a temperature of more or equal to 450° C. and less than 810° C., the material R2 being obtained by preheating cement raw material R1 inputted to the preheater 4 in the highest stage cyclone 4D and the third cyclone 4C of the preheater 4, and amount of the cement raw material R2 can be adjusted through a flow rate adjusting gate 18 arranged between the preheater 4C and the mixing and heating device 19.

Next, a method for reducing mercury content of cement kiln exhaust gas according to the present invention with the apparatus for reducing mercury content of cement kiln exhaust gas 11 with the above construction will be explained with reference to FIG. 1.

From the exhaust gas G1 discharged from the highest stage cyclone 4D of the preheater 4 is removed dust by the dust collector 6, and the coarse powder D2 and the collected dust D4 as kiln dusts obtained though the cyclone 13 and the like and the cement raw material R2 withdrawn from the third cyclone 4C of the preheater 4 are introduced to the mixing and heating device 19, and mixing and agitating them for 5-30 minutes heats the coarse powder D2 and the collected dust D4 until the temperatures thereof reach 400° C. as boiling point of mercury, and mercuries included in the coarse powder D2 and the collected dust D4 are vaporized.

The mercury-removed dust D5 discharged from the mixing and heating device 19 is utilized as a cement raw material by returning to the second cyclone 4B positioning at a lower stage from the cyclone 4C from which the cement raw material R2 is withdrawn. On the other hand, the exhaust gas G4 discharged from the mixing and heating device 19 is introduced to the high temperature dust collector 22, and the mercury-removed dust D6 included in the exhaust gas G4 is collected to return to the second cyclone 4B together with the mercury-removed dust D5.

Next, the exhaust gas G5 discharged from the high temperature dust collector 22 is introduced into the heat exchanger 24, and vaporized mercury included in the exhaust gas G5 is condensed by indirectly contacting it to cooling water W. An exhaust gas G6 discharged from the heat exchanger 24 and the condensed mercury Hg are introduced into the mercury recovery tank 25, and the condensed mercury Hg is stored in the mercury recovery tank 25, and the exhaust gas G7 is discharged into the atmosphere via the gas/liquid separator 26, the flow rate control valve 27, the dust collector 14 and the fan 16.

As described above, with the present embodiment, the coarse powder D2 and the collected dust D4 (cement kiln dusts) are mixed into the cement raw material R2 withdrawn from the third cyclone 4C, the cement raw material having a temperature of approximately 450° C. to 810° C. suitable for vaporizing mercury included in cement kiln dusts, and heat is recovered from the mixture of the coarse powder D2, the collected dust D4 and the cement raw material R2 after the mixing and heating in the second cyclone 4B positioning at a lower stage from the third cyclone 4C, so that mercury included in the cement kiln dusts can be efficiently recovered while heat loss is suppressed. In addition, since the mercury reduction apparatus 11 has the mixing and heating device 19, a withdrawing device, feeders and so on only, it is not required to separately mount a classifier to the prestage of the mercury reduction apparatus 11 like the conventional technique, so that device structure thereof can be simplified to reduce device and operation costs.

Meanwhile, in the embodiment described above is explained a case that the cement raw material R2 is withdrawn from the third cyclone 4C of the preheater 4 and the mercury-removed dusts D5, D6 are returned to the second cyclone 4B, but the mercury-removed dusts D5, D6 may be returned to the lowest stage cyclone 4A. In addition, the cement raw material R2 may be withdrawn from the second cyclone 4B, and the mercury-removed dust may be returned to the lowest stage cyclone 4A.

The reason why the cement raw material is not withdrawn from the highest stage cyclone 4D of the preheater 4 is that heat enough to vaporize the mercuries included in the coarse powder D2 and the collected dust D4 cannot be obtained therefrom. In addition, the reason why the cement raw material is not withdrawn from the lowest stage cyclone 4A is that material in the cyclone 4A has decarbonized, which greatly influences cement burning and increases heat loss. As described above, it is preferable to use the cement raw material R2 with a temperature of approximately 450° C. to 810° C. withdrawn from the second cyclone 4B or the third cyclone 4C.

Further, the reason why the mercury-removed dusts D5, D6 are returned to the cyclone positioning a lower stage from a cyclone from which the cement raw material R2 is withdrawn is to avoid increases in the number of facilities and in transporting cost by lifting the withdrawn mercury-removed dusts D5, D6.

In addition to the above construction, thermometers (not shown) for measuring temperatures of the mercury-removed dusts D5, D6 can be mounted on discharging ports for the dusts D5, D6 of the mixing and heating device 19 and the high temperature dust collector 22 respectively, and amount of the cement raw material R2 withdrawn from the third cyclone 4C can be adjusted with the flow rate adjusting gate 18 according to indicated values on the thermometers. With this, adverse effects on the cement burning device by withdrawing the cement raw material R2 can be minimized.

In addition, adding chlorine component to the coarse powder D2 and the collected dust D4 causes mercuries included in the coarse powder D2 and the collected dust D4 to be converted into chlorides, which can lower boiling point of the mercuries to reduce operation cost.

Meanwhile, mercury is unevenly distributed in the collected dust D4 on fine powder side of the kiln dust D1, so that the coarse powder D2 recovered in the cyclone 13 is not always required to be fed to the mixing and heating device 19 and treated therein but can be used as a part of the cement raw material R1 as it is.

In addition, in case that the preheater 4 has a five or six stage cyclone, the cement raw material R2 is withdrawn from a cyclone other than the highest stage and the lowest stage cyclones, the material R2 having a temperature of approximately 450° C. to 810° C., and the mixture discharged from the mixing and heating device is returned to the cyclone positioning at a lower stage from a cyclone from which the cement raw material R2 is withdrawn, which can obtain the same action effect as that of the embodiment described above.

Further, mercury adsorbent such as activated carbon inputted into a passage of the cement kiln exhaust gas G1 captures mercury included in the exhaust gas G1 as the kiln dust D1 in the dust collector 6 to prevent mercury from discharging together with the exhaust gas G1 through the chimney 7, and the kiln dust D1 (D2 and D4) is heated in the mercury reduction apparatus 11 to recover the mercury, which can control amount of mercury discharging into the atmosphere.

DESCRIPTION OF THE REFERENCE NUMERALS 1 cement burning device
2 cement kiln
3 clinker cooler
4 preheater
4A lowest stage cyclone
4B second cyclone
4C third cyclone
4D highest stage cyclone
5 calciner
6 dust collector
7 chimney
8 mercury adsorbent feeder
11 apparatus for reducing mercury content of cement kiln exhaust gas
12 pneumatic transporter
13 cyclone
14 dust collector
15 volumetric feeder
16 fan
18 flow rate adjusting gate
19 mixing and heating device
21 mercury recovery device
22 high temperature dust collector
24 heat exchanger
25 mercury recovery tank
26 gas/liquid separator
27 flow rate control valve
D1 kiln dust
D2 coarse powder
D3 fine powder
D4 collected dust
D5, D6 mercury-removed dusts
G1 cement kiln exhaust gas
G2-G7 exhaust gases
R1, R2 cement raw materials
W cooling water

The invention claimed is:

1. An apparatus for reducing mercury content of cement kiln exhaust gas comprising:
    a first feeder configured to receive cement kiln dust included in a cement kiln combustion gas;
    a mixing and heating device in operative communication with the first feeder to receive cement kiln dust therefrom, the mixing and heating device being configured to be placeable in operative communication with a cyclone other than a highest stage cyclone and a lowest stage cyclone of a preheater for preheating cement raw material to receive cement raw material withdrawn therefrom and to mix the received cement kiln dust into the received cement raw material while heating the cement kiln dust through sensible heat of the withdrawn cement raw material;
    a mercury recovery device for recovering mercury vaporized from the cement kiln dust by the mixing and heating; and
    a second feeder for feeding a mixture of the cement kiln dust and the cement raw material discharged from the mixing and heating device to a cyclone positioning at a lower stage from the cyclone from which the cement raw material is withdrawn.

2. The apparatus for reducing mercury content of cement kiln exhaust gas as claimed in claim 1, further comprising a thermometer for measuring temperature of the mixture of the cement kiln dust and the cement raw material discharged from the mixing and heating device, and
    a controller for controlling amount of the cement raw material withdrawn from the cyclone based on the measurement result.

3. The apparatus for reducing mercury content of cement kiln exhaust gas as claimed in claim 1, further comprising a chlorine adding device for adding chlorine to the cement kiln dust.

4. The apparatus for reducing mercury content of cement kiln exhaust gas as claimed in claim 1, wherein an activated carbon as a mercury adsorbent is fed, and a dust collector for recovering mercury included in the exhaust gas of the preheater in the cement kiln dust is mounted.

5. The apparatus for reducing mercury content of cement kiln exhaust gas as claimed in claim 2, further comprising a chlorine adding device for adding chlorine to the cement kiln dust.

6. The apparatus for reducing mercury content of cement kiln exhaust gas as claimed in claim 2, wherein an activated carbon as a mercury adsorbent is fed, and a dust collector for recovering mercury included in the exhaust gas of the preheater in the cement kiln dust is mounted.

7. The apparatus for reducing mercury content of cement kiln exhaust gas as claimed in claim 3, wherein an activated carbon as a mercury adsorbent is fed, and a dust collector for recovering mercury included in the exhaust gas of the preheater in the cement kiln dust is mounted.

8. The apparatus for reducing mercury content of cement kiln exhaust gas as claimed in claim 1, further comprising a high temperature dust collector downstream of the mixing and heating device and configure to receive an exhaust gas from the mixing and heating device and remove dust from the exhaust gas.

9. The apparatus for reducing mercury content of cement kiln exhaust gas as claimed in claim 8, further comprising a heat exchanger downstream of the high temperature dust collector and configured to receive exhaust gas discharged from the high temperature dust collector and condense vaporized mercury in the exhaust gas via indirect contact with cooling water.

10. A method for reducing mercury content of cement kiln exhaust gas using the apparatus of claim 1, the method comprising the steps of:
    receiving, at the first feeder, cement kiln dust included in a cement kiln combustion gas;
    receiving cement kiln dust from the first feeder at the mixing and heating device in operative communication with the first feeder;
    mixing, with the mixing and heating device, the received cement kiln dust included in a cement kiln combustion exhaust gas into a cement raw material withdrawn from a cyclone other than a highest stage cyclone and a lowest stage cyclone of a preheater for preheating cement raw material while heating the cement kiln dust through sensible heat of the withdrawn cement raw material;
    using the mercury recover device to recover mercury vaporized from the cement kiln dust by the mixing and heating; and
    returning, via the second feeder, a mixture of the cement kiln dust and the cement raw material after the mixing and heating to a cyclone positioning at a lower stage from the cyclone from which the cement raw material is withdrawn.

11. The method for reducing mercury content of cement kiln exhaust gas as claimed in claim 10, further comprising the steps of measuring temperature of the mixture of the cement kiln dust and the cement raw material discharged from the mixing and heating device, and controlling amount of the cement raw material withdrawn from the cyclone based on the measurement result.

12. The method for reducing mercury content of cement kiln exhaust gas as claimed in claim 10, further comprising the step of adding chlorine to the cement kiln dust.

13. The method for reducing mercury content of cement kiln exhaust gas as claimed in claim 10, further comprising the steps of adding an activated carbon as a mercury adsorbent to an exhaust gas of the preheater and recovering mercury included in said exhaust gas in the cement kiln dust.

14. The method for reducing mercury content of cement kiln exhaust gas as claimed in claim 11, further comprising the step of adding chlorine to the cement kiln dust.

15. The method for reducing mercury content of cement kiln exhaust gas as claimed in claim 11, further comprising the steps of adding an activated carbon as a mercury adsorbent to an exhaust gas of the preheater and recovering mercury included in said exhaust gas in the cement kiln dust.

16. The method for reducing mercury content of cement kiln exhaust gas as claimed in claim 12, further comprising the steps of adding an activated carbon as a mercury adsorbent to an exhaust gas of the preheater and recovering mercury included in said exhaust gas in the cement kiln dust.

\* \* \* \* \*